Figure 1:
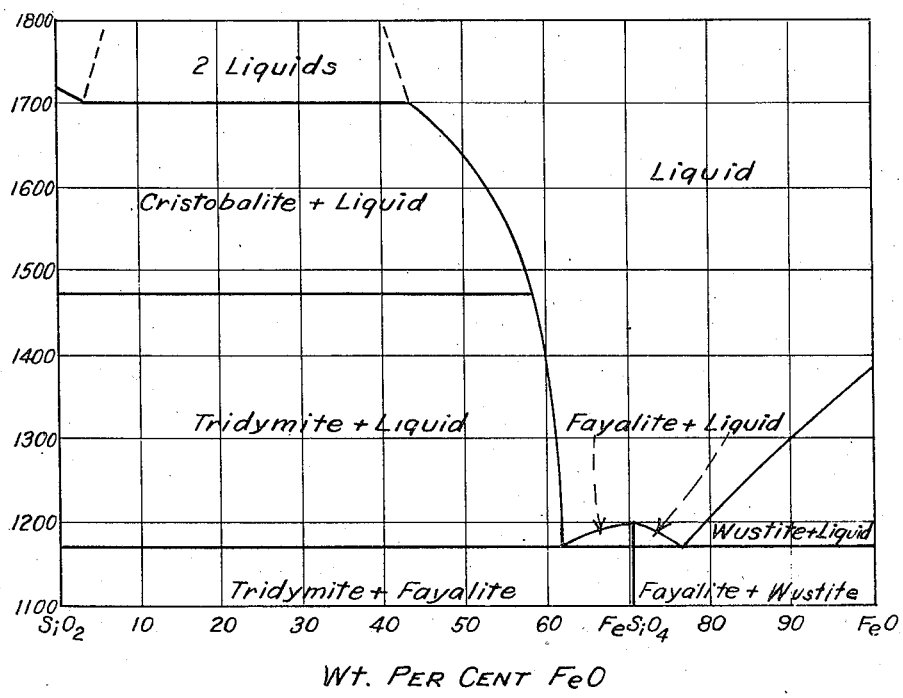

Dec. 30, 1947.          L. W. AUSTIN          2,433,415
REFRACTORY COMPOSITION
Filed July 30, 1945

SYSTEM $Fe O - Si O_2$

Wt. PER CENT FeO

INVENTOR.
LESLIE W. AUSTIN
BY James E. Toomey
Agt.

Patented Dec. 30, 1947

2,433,415

UNITED STATES PATENT OFFICE 2,433,415

REFRACTORY COMPOSITION

Leslie W. Austin, San Jose, Calif., assignor, by mesne assignments, to The Permanente Metals Corporation, Oakland, Calif., a corporation of Delaware Application July 30, 1945, Serial No. 607,776

14 Claims. (Cl. 106—60)

This invention has as its object the formation of a bond for basic refractory masses which are used as formed shapes, masses which are rammed into place in a furnace, and other compositions which are used as mortars or sprayed onto masonry structures. The bond provided by this invention is of such a nature that it forms at relatively low temperatures a strong ceramic binder which is satisfactory under load up to temperatures as high as 1750° C.

In the manufacture of basic refractories it is the usual practice to construct the refractory bodies from an aggregate of strong refractory grains and a binder of relatively finely divided material which may be the same as that of the grains but more often comprises one or more substances of dissimilar nature. The bond between the coarser grains is supplied by fusions or reactions in the finer material when the body is subjected to high temperatures, either in a kiln or in service. When the body is to be placed in service without previous kiln firing, it is customary to use a temporary chemical bond to provide strength to resist damage from handling or service loading until the formation of the ceramic or mineral bond under the heat of the furnace in which the refractory is installed. Examples of such bonds are: Sorel cements, sodium silicate, organic binders, etc.

However, as the temperature is raised, the temporary chemical or organic bonds have the disadvantage of weakening before the ceramic bond has begin to form, and consequently, a chemically bonded refractory exhibits a zone of weakness between the hot face and the cold face when the refractory is placed in the furnace in the unburned condition and fired in service. A further disadvantage of such chemically bonded refractories is that they may not be used in many intermediate temperature applications in which it would otherwise be desirable to use them because the chemical bond is weakened or destroyed by the heat, which is insufficient to form the ceramic bond, and the weakened refractories are unable to satisfactorily resist the erosion and abrasion of the service conditions. Consequently, it has been necessary to employ the more expensive kiln-fired refractories for such installations.

In order to form a ceramic bond of sufficient strength between the refractory grains it has previously been necessary to fire the refractory bodies at temperatures approximating the highest temperatures to be met in the service for which the product is designed. For, if the binding materials were selected from those which would sinter together at intermediate temperatures, these same materials would become fluid at high temperatures and the refractory would fail as would a pile of wet sand when placed under load.

The value of developing a refractory, crystalline ceramic bond at lower temperatures is very great. A few of the advantages of this important characteristic are: (1) the greater ease and rapidity of burning in of rammed masses, sprays, or mortars, (2) the improved strength obtained in the intermediate zone between the hot and cold faces of chemically bonded refractories, (3) the possibility of obtaining satisfactory burned basic refractory shapes at temperatures much lower than those ordinarily required for burning.

Accordingly, it is the object of the invention to provide basic refractory compositions which develop a strong ceramic bond when fired at intermediate temperatures without impairing refractoriness under load at high temperatures. Other objects and advantages may become apparent from consideration of the following disclosure.

My invention is predicated upon the discovery that if finely divided iron silicate and sufficient magnesia are intimately intermixed they may be used with basic or neutral refractory grains as a bonding agent which gives a strong ceramic bond at intermediate temperatures, of the order of 1200° C., and which continues to provide a strong ceramic bond at high temperatures, of the order of 1700° C. or more. If the magnesia and iron silicate are each of relatively high purity, I have found that this bond will withstand a load of 25 pounds per square inch to temperatures as high as 1750° C. without shearing or excessive slumping.

As an example of the benefit to be gained from the use of iron silicate in a basic refractory composition, a high-purity chemically bonded magnesia brick may be cited. Before the addition of iron silicate to the composition, this brick had the properties shown in column I of the table. Upon the addition of 10% of iron silicate to the same composition the properties shown in column II were determined. It may be seen that the resistance to crushing of specimens fired to intermediate temperatures was markedly improved, while the resistance to failure under load at high temperature was not impaired.

*Table I*

| Firing Temperature | Column I Crushing Stress | Column II Cold, p. s. i. |
|---|---|---|
| Unfired | 11,400 | 10,000 |
| 800° C | 3,700 | 7,900 |
| 1000° C | 5,100 | 8,400 |
| 1200° C | 7,550 | 10,200 |
| 1400° C | 11,950 | 18,750 |

Unburned, chemically bonded, failure temperatures under load of 25 pounds per square inch:

° C.
Sheared at _____ 1750
5½% deformation at _____ 1735

Reference to the phase-rule diagram of the system $FeO-SiO_2$ shown in Figure I shows that combinations of iron oxide and silica have melting points as low as 1175° C. The influence of small amounts of magnesia and other additives may form eutectics of even lower melting temperatures. It therefore would appear highly inadvisable to include iron silicate in a refractory bond. However, I have discovered that it is possible to use iron silicate in a refractory bond to give the advantage of superior bonding at intermediate temperatures without loss of refractoriness at high temperatures, provided that the iron silicate be finely divided and used in the presence of excess magnesia.

The method of bonding disclosed in this invention is different in principle from the bonds ordinarily employed in basic refractories. In general, the bonding materials previously used have themselves been highly refractory materials, and every effort has been made to insure that any lower melting components of the bond are reduced to the practical minimum. This selection of materials has been necessary because the presence of less refractory materials in the bond has resulted in very marked lowering of the top working temperature of the refractory under load. In direct contrast to the previous art, I prefer to use in my bond a substantial proportion of iron silicate, which may be a liquid at temperatures as low as 1175° C. By employing the bond of the invention I have been able to make chemically bonded magnesia bricks which do not fail under load of 25 pounds per square inch until a temperature of 1750° C. is reached, in contrast to the performance of the known chemically bonded magnesia bricks, which generally fail under the same load within a few degrees of 1550° C. or even less. The chemical bonds may be used in conjunction with but do not necessarily become a part of or a limiting factor on the bond of the invention.

The essential feature of the invention is the provision of a bond which is formed at intermediate temperatures, but which immediately stabilizes itself so that it maintains refractoriness at high temperatures. In spite of the fact that iron silicate melts at a low temperature, of the order of 1200° C., in the presence of excess magnesia the pure materials do not form sufficient liquids to cause failure under load of a refractory body in which they are used until the melting point of magnesio-ferrite, 1780° C. is approached.

When alumina, lime, boric oxide, and the like are present in excessive amounts, the eutectics formed between these fluxes and magnesia and iron silicate not only melt at relatively low temperatures, but they do not stabilize themselves on heating to higher temperatures, as do iron silicate and magnesia alone in forming forsterite and magnesio-ferrite. On the contrary, as the temperature is raised they have increasing solubility for the magnesia and iron silicate and consequently form increasing amounts of liquids. The proportion of liquids formed is several times the proportion of these fluxing agents in the composition.

The presence of excessive impurities and their deleterious effect on refractories may be readily shown by the hot load test. With satisfactory materials a temperature of 1750° C., before failure by shear, is attainable, while with poor materials it is difficult to make a brick which will withstand temperatures much over 1500° C.

*General method*

In order to produce chemically bonded refractories which may be heated to very high temperatures while under load without undergoing excessive deformation it is essential that the iron silicate and magnesia be of high purity, finely divided and intimately intermixed. The proportion of magnesia to be used with the iron silicate will depend upon the proportions of iron oxide and silica in the silicate. Sufficient magnesia should be present to allow the conversion of the iron oxide component to magnesio-ferrite, and of the silica component to magnesium orthosilicate. When the grains being bonded are magnesia, the finer portions of the grain may serve to supply part or even all of the magnesia requirement for the bond. On the other hand, it may be desirable to include an excess of magnesia over that needed to satisfy the iron silicate in the bonding composition in order to insure the presence of sufficient magnesia to promote and bring to completion without formation of excess liquids the reaction with the iron silicate to form magnesio-ferrite and magnesium orthosilicate or to convert low-melting components associated with the refractory grain material into more refractory compounds.

Iron silicate of satisfactory purity from any source may be used in the practice of the invention. For example, natural minerals rich in iron silicate may be used, provided that they are low in fluxing components such as $Al_2O_3$, $CaO$, $B_2O_3$, etc. However, as a source of more easily controllable purity, it is relatively easy to prepare the iron silicate by fusing together silica and iron oxide in the proper proportions. The resulting slag is first very finely pulverized and is then ready for use. Small amounts of magnesia in the composition of the iron silicate may beneficially lower the melting point and the temperature of formation of the ceramic bond. As may be seen from Figure I, the phase diagram, the composition of the iron silicate used is not critical, as the iron oxide analysis may vary from about 60% to 80% while the silica content varies from 40% to 20% without greatly affecting the melting point; and even compositions on either side of these ranges may be satisfactorily employed with, however, less beneficial results in lowering the temperature of formation of the ceramic bond. Satisfactory results have been obtained, for example, from material analysing 63% FeO, 34.8% SiO₂, 2% MgO, and traces only of alumina and lime.

In order to obtain the high resistance to failure under load as described above it is necessary that the iron silicate and magnesia be finely divided, e. g., on the order of minus 100 mesh or preferably even finer. However, coarser particles may be employed in those conditions where it may be desirable to develop thermal plasticity at an intermediate stage in heating and while high refractoriness is later obtained when equilibrium is reached.

The finely divided magnesia and iron silicate mixture by itself may be used as a bonding mortar for basic bricks, or it may be used as the bonding medium for basic or neutral refractory grains in pressed shapes, ramming mixes, sprays, mortars, or the like. The amount of the bonding mixture to be used will vary with the type of refractory product being made; in general the amounts to be used correspond to the amounts of other bonding materials previously employed. The range may be from as little as two or three per cent to as much as 45 or 50 per cent, the variation depending on the sizing of the grain being bonded as well as on the application for which the product is designed. I have obtained good results in bricks, for example, in using iron silicate in the proportion of 10% of the batch, the magnesia to be added depending on the iron to silica ratio in the silicate and on the nature of the refractory grain being employed. Further particulars of the use of this bonding agent may be learned from the examples given below.

*Specific Example I*

As an example of the use of the invention in bonding basic brick, a periclase brick may be made as follows: Seawater periclase is ground so that it will all pass a screen of six meshes to the inch and approximately one-third of it will pass a 100-mesh screen. To this periclase grain material in a wet-pan mixer is added ten percent by weight of finely powdered iron silicate, five per cent of finely powdered slow-setting magnesia, two per cent of magnesium chloride, and four per cent of water. The batch is mixed until the bonding ingredients are uniformly dispersed throughout the grain, and the material is then pressed under high pressures into the desired shapes. The result, after curing and drying, is a body which has high cold strength due to the magnesium oxychloride cement, high strength after firing to intermediate temperatures, and satisfactory strength at temperatures of 1700° C. or more. This brick may be used as a chemically bonded brick or as a burned brick after firing to temperatures as low as 1200° C. When tested under load of 25 pounds per square inch, brick of this composition have been heated as high as 1750° C. before failure by shear.

*Specific Example II*

Iron silicate and magnesia together serve as an excellent bond for refractory grains used as ramming mixes. One example of such a ramming mix may be prepared as follows: Periclase of the same sort as in Example I is used, except that to gain increased plasticity the fine portion is increased so that approximately 35% will pass a 325-mesh screen. Ten per cent of iron silicate pulverized to pass through a 100-mesh screen is added to the periclase, and 3 per cent of powdered sodium silicate is included to provide an air-setting binder. After thorough mixing the dry mix is suitable for use. In use, it is carefully tempered with enough water to secure plasticity but avoiding an excess. About six per cent water gives satisfactory results. The tempered mix is then rammed into place in the desired location, preferably with pneumatic rammers such as those used in foundry work for molding sands. On drying, it sets to a hard, dense structure, and upon firing to 1200° C. or higher it becomes strongly bonded into a refractory mass which is highly resistant to basic slags such as those encountered in steel furnaces.

*Specific Example III*

The invention may be employed to produce a highly refractory basic bonding mortar or spray mix. As for example, I have used the following: Periclase from sea-water magnesia is ground and sized so that it will all pass a screen of 40 meshes to the inch, half being retained on a 100-mesh screen, and half passing the 100-mesh. Approximately 35% of the periclase should be finer than 325-mesh. Periclase of this fineness is mixed with 10% of its weight of finely ground iron silicate. If an air-setting mortar is desired, 2% sodium silicate powder is added. When mixed with sufficient water, this composition results in a very satisfactory bonding mortar for basic bricks.

In the examples cited, the refractory grain employed has been periclase. However, the utility of the invention is not limited to periclase or dead-burned magnesia. Other basic refractory materials such as ground chrome ore, olivine, forsterite, and the like may be substituted for all or part of the coarser periclase grains, provided that an excess of finely divided magnesia is available to satisfy all of the iron silicate and bring about its conversion to forsterite and magnesio-ferrite. In the claims and in the specification, the term "basic" refractories is to be taken to mean "non-acid" refractories, and thus includes neutral refractory grains such, for example, as chrome spinel, spinel, or chromite, among others.

Having thus described my invention and given examples illustrating some of the ways in which it may be employed beneficially in refractory compositions, what I claim is:

1. An unfired refractory composition comprising basic refractory grains and a bonding material of iron silicate and magnesia.

2. Refractory basic bonding mortar comprising iron silicate and magnesia.

3. Basic refractory ramming mixes of the composition of claim 1.

4. A bonding agent for basic refractory compositions which comprises iron silicate and magnesia.

5. The process of manufacturing refractory compositions comprising adding as bonding material to a mass of basic refractory grains a mixture of iron silicate and magnesia, substantially free from impurities.

6. The process of manufacturing refractory compositions comprising adding as bonding material to a mass of basic refractory grains a mixture of iron silicate and magnesia, wherein the iron silicate is formed by fusion of silica and iron oxide.

7. The process of manufacturing refractory compositions comprising adding as bonding material to a mass of basic refractory grains a mixture of magnesia and natural iron silicates substantially free of impurities.

8. The process of manufacturing refractory compositions comprising adding as bonding material to a mass of basic refractory grains a mixture of iron silicate and magnesia, heating the mass to cause the iron silicate to react with the magnesia to form a crystalline ceramic bond of magnesio-ferrite and magnesium orthosilicate between said refractory grains.

9. The process of manufacturing refractory compositions comprising adding as bonding material to a mass of basic refractory grains a mixture of iron silicate and magnesia, heating the mass to a temperature of at least 800° C. to cause the iron silicate to react with the magnesia to form a ceramic bond between said refractory grains.

10. The process of manufacturing refractory compositions comprising adding as bonding material to a mass of basic refractory grains an amount of iron silicate and magnesia which upon heating will react to form magnesio-ferrite and magnesium orthosilicate between said refractory grains.

11. The process of manufacturing refractory compositions comprising adding as bonding material to a mass of basic refractory grains an amount of iron silicate and magnesia which upon heating to a temperature of approximately 1400° C. will react to form magnesio-ferrite and magnesium orthosilicate between said refractory grains.

12. In the process of manufacturing chemically bonded basic refractories the steps which comprise preparing a batch of basic refractory grains, adding a material adapted to form a temporary chemical bond, and adding an additional material adapted to form a ceramic bond under heat comprising a mixture of iron silicate and magnesia.

13. The process of manufacturing refractory compositions which comprises preparing a batch of basic refractory grains, and adding to the batch a mixture of finely divided magnesia and iron silicate wherein magnesia is present in an amount sufficient to convert, upon heating, substantially all of the iron silicate to magnesio-ferrite and magnesium orthosilicate as a bond between said refractory grains.

14. A basic refractory composition comprising an admixture of basic refractory grains, a material adapted to form a temporary chemical bond, and a material adapted to form a ceramic bond, under heat, between said grains and comprising a mixture of finely divided iron silicate and finely divided magnesia.

LESLIE W. AUSTIN.

REFERENCES CITED

The following references are of record in the file of this patent:

UNITED STATES PATENTS

| Number | Name | Date |
|---|---|---|
| 792,882 | Davison | June 20, 1905 |
| 930,575 | Tripmacher | Aug. 10, 1909 |
| 1,330,263 | Handy | Feb. 10, 1920 |
| 1,965,605 | McCaughey et al. | July 10, 1934 |
| 2,341,561 | Kinzie et al. | Feb. 15, 1944 |

FOREIGN PATENTS

| Number | Country | Date |
|---|---|---|
| 44,664 | Denmark | 1931 |
| 50,149 | Norway | 1932 |
| 136,863 | Switzerland | 1930 |
| 304,123 | Canada | 1930 |
| 337,605 | Great Britain | 1930 |

Certificate of Correction

Patent No. 2,433,415.    December 30, 1947.

LESLIE W. AUSTIN

It is hereby certified that errors appear in the printed specification of the above numbered patent requiring correction as follows: Column 3, lines 8 to 10 inclusive, the heading to Table I should appear as shown below instead of as in the patent—

| Firing Temperature | Column I | Column II |
|---|---|---|
|  | Crushing Stress, Cold, p. s. i. || lines 21, 22, and 23, strike out

```
                                                    ° C.
Sheared at----------------------------------------- 1750
5½% deformation at-------------------------------- 1735
``` and insert instead

```
                                          ° C.    ° C.
Sheared at------------------------------ 1750
5½% deformation at---------------------------- 1735
``` and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*